United States Patent
Damevin et al.

(10) Patent No.: US 10,385,708 B2
(45) Date of Patent: Aug. 20, 2019

(54) GUIDE ASSEMBLY WITH OPTIMISED AERODYNAMIC PERFORMANCE

(71) Applicant: Safran Aircraft Engines, Paris (FR)

(72) Inventors: Henri-Marie Damevin, Moissy-Cramayel (FR); Philippe Jacques Pierre Fessou, Moissy-Cramayel (FR); Vianney Christophe Marie Maniere, Moissy-Cramayel (FR); Michael Franck Antoine Schvallinger, Moissy-Cramayel (FR)

(73) Assignee: SNECMA, Paris (FR)

( * ) Notice: Subject to any disclaimer, the term of this patent is extended or adjusted under 35 U.S.C. 154(b) by 172 days.

(21) Appl. No.: 15/549,647

(22) PCT Filed: Feb. 9, 2016

(86) PCT No.: PCT/FR2016/050274
§ 371 (c)(1),
(2) Date: Aug. 8, 2017

(87) PCT Pub. No.: WO2016/128664
PCT Pub. Date: Aug. 18, 2016

(65) Prior Publication Data
US 2018/0030843 A1 Feb. 1, 2018

(30) Foreign Application Priority Data
Feb. 9, 2015 (FR) ........................................ 1551013

(51) Int. Cl.
*F01D 9/04* (2006.01)
*F01D 5/14* (2006.01)
(Continued)

(52) U.S. Cl.
CPC ............. *F01D 9/041* (2013.01); *F01D 5/141* (2013.01); *F01D 25/162* (2013.01); *F02K 3/06* (2013.01);
(Continued)

(58) Field of Classification Search
CPC ... F01D 9/041; F01D 9/02; F01D 9/06; F01D 9/065; F01D 5/141; F01D 5/142;
(Continued)

(56) References Cited

U.S. PATENT DOCUMENTS 3,617,147 A * 11/1971 Bragg ..................... F01D 9/041
244/53 B
7,553,129 B2 * 6/2009 Hoeger ................... F01D 5/143
415/193

(Continued)

OTHER PUBLICATIONS

International Written Opinion received for PCT Patent Application No. PCT/FR2016/050274, dated May 11, 2016, 12 pages (6 pages of English Translation and 6 pages of Original Document).

(Continued)

*Primary Examiner* — Carlos A Rivera
*Assistant Examiner* — Danielle M. Christensen
(74) *Attorney, Agent, or Firm* — Womble Bond Dickinson (US) LLP

(57) ABSTRACT

The invention relates to a turbine engine air flow guide assembly including: a structural arm (30); and a guide vane (21) on the lower surface of the structural arm, comprising a leading edge (22), a trailing edge (23), and a camber line (24), said vane and arm extending radially about an axis (X-X) of the turbine engine and defining therebetween an air flow channel. The structural arm (30) comprises: an upstream end (31) having a guide vane profile (21) and comprising a leading edge (32) aligned with that of the vane; and a shoulder (35) located on the lower surface of the arm, defining a neck in the channel. The assembly is character-
(Continued)

ized in that the area ($A_{neck}$) of the section of the channel at the neck is between 0.7 and 0.9 times the area ($A_{inlet}$) of the section of the channel at the leading edges.

5 Claims, 2 Drawing Sheets

(51) Int. Cl.
*F02K 3/06* (2006.01)
*F04D 29/54* (2006.01)
*F04D 29/66* (2006.01)
*F04D 29/68* (2006.01)
*F01D 25/16* (2006.01)

(52) U.S. Cl.
CPC ......... *F04D 29/544* (2013.01); *F04D 29/667* (2013.01); *F04D 29/681* (2013.01); *F05D 2220/32* (2013.01); *F05D 2240/123* (2013.01); *F05D 2260/97* (2013.01); *Y02T 50/673* (2013.01)

(58) Field of Classification Search
CPC ........ F01D 5/145; F01D 25/12; F04D 29/681; F04D 29/667; F04D 29/544; F05D 2240/12; F05D 2240/121; F05D 2250/73; F05D 2250/711; F05D 2250/712
See application file for complete search history.

(56) References Cited

U.S. PATENT DOCUMENTS

| 8,678,760 B2 * | 3/2014 | Clemen | F01D 5/141 415/209.1 |
|---|---|---|---|
| 2006/0024158 A1 | 2/2006 | Hoeger et al. | |
| 2011/0255964 A1 | 10/2011 | Clemen | |
| 2013/0259672 A1 | 10/2013 | Suciu et al. | |

OTHER PUBLICATIONS

International Preliminary Report on Patentability issued for PCT Application No. PCT/FR2016/050274, dated Aug. 24, 2017, 15 pages (8 pages of English Translation and 7 pages of original document).

International Search Report with English language translation, dated May 11, 2016, International Application No. PCT/FR2016/050274.

* cited by examiner

GUIDE ASSEMBLY WITH OPTIMISED AERODYNAMIC PERFORMANCE

FIELD OF THE INVENTION

The invention relates to a turbine engine air flow guide assembly, comprising guide vanes and one or more structural arms. The invention applies in particular to bypass type turbine engines.

PRIOR ART

A bypass type turbine engine for aeronautical propulsion is shown in FIG. 1a. It comprises a fan 10 delivering an air flow of which a central portion, called the primary flow $F_P$, is injected into a compressor 12 which supplies a turbine 14 driving the fan.

The peripheral portion, called the secondary flow $F_S$, of the air flow, is for its part ejected into the atmosphere to supply the major portion of the thrust of the turbine engine 1, after having passed through a fixed vane 20 ring 21 arranged downstream of the fan. This ring, called a guide 20 (also known under the acronym OGV for "outlet guide vane") makes it possible to guide the secondary air flow at the outlet of the fan, while limiting losses to a maximum.

A structural arm 30 is shown in the same figure, which connects the ferrule 16 of the intermediate casing to the hub 17 of the intermediate casing, thus contributing to supporting and holding in position the engine shaft(s) 18 and ensuring the structural strength of the assembly. The structural arm also has the function of allowing the transmission of movement or of fluids between the turbine engine and the rest of the aircraft on which it is mounted. To this end, the structural arm is hollow, and makes it possible to accommodate lines, transmission shafts, etc.

Several types of structural arms exist, depending on their function and their position in the turbine engine.

For example, so-called "main" structural arms, the main function whereof is to support the turbine engine under the wing of the airplane, are positioned at "6 o'clock" and at "12 o'clock," i.e. vertically with respect to the airplane arranged on horizontal ground (terminology compared with the position of the hands of a watch).

So-called "auxiliary" structural arms do not have the main function of supporting the turbine engine, but rather to accomplish power transmission, by being hollow so as to contain a transmission shaft. These arms are positioned at "8 o'clock" for example, that is obliquely with respect to the vertical.

All types of structural arms are also utilized to transmit utilities from the turbine engine to the rest of the airplane, that is to say for example oil lines, fuel lines, etc.

For the purpose of reducing the mass of a turbine engine and to improve its performance, it has been proposed to group the functions of the secondary flow guide and the structural arm into a single part, and this for all types of structural arms.

As shown in FIG. 1b, so-called "integrated" guide vanes have been proposed, formed by a structural arm, in this particular case of the auxiliary type described above, of which an upstream portion is shrouded to have the aerodynamic profile of a guide vane.

Such a structural arm therefore has geometrically constrained portions which are:

An upstream end portion 31, the geometry whereof must be that of a guide vane, and A hollow zone 34 for transmitting utilities, in which are arranged lines, transmission shafts, etc. This zone takes into account a considerable number of constraints of the utility volume, operating and assembly clearance, thickness of material type, etc., called a "keep-out zone," meaning that it must be kept unchanged in case of a change in geometry of the structural arm.

Compliance with these constraints leads to the creation, for the structural arm, of a geometry significantly obstructing the airflow streams constituted by the guide vanes situated on either side of the arm.

In particular, the presence of the keep-out zone downstream of the shrouded portion of the arm forms a shoulder 35 on the lower surface 30i side of the arm which obstructs the airflow stream situated between the lower surface 30i of the arm and the vane 21.

As can be seen in FIG. 1c, the flow of air in this stream then accelerates strongly until it reaches supersonic speed at the throat. The sudden transition between a subsonic stream and a pocket of supersonic air can generate a shock wave O inducing considerable head losses.

In addition it is also possible to observe, in this geometry, separation D of the boundary layer of the air flow downstream of the throat, which also produces head losses and therefore performance losses in the guide.

Therefore there exists a need to correct the problems posed by this geometry.

PRESENTATION OF THE INVENTION

The invention has as its aim to mitigate the disadvantages of the prior art, by proposing an air flow guide assembly having aerodynamic performance that is improved by comparison with the prior art.

One aim of the invention is to propose an air flow guide assembly the geometry whereof eliminates the risks of a shock wave and of separation of the boundary layer of the air flow.

In this respect, the invention has as its object a turbine engine air flow guide assembly comprising:
 a structural arm, and
 at least one guide vane, situated at the lower surface 30i of the structural arm and comprising a leading edge, a trailing edge and a camber line extending between the leading edge and the trailing edge,
wherein the vane and the arm extend radially around an axis of the turbine engine and define an air flow channel between them,
and the structural arm comprises:
 an upstream end, with respect to the air flow direction in the channel, having a guide vane profile and comprising a leading edge aligned with the leading edge of the vane, and
 a shoulder situated at the lower surface 30i of the arm, defining a throat in the channel upstream of which the channel is convergent and downstream of which it is divergent,
characterized in that the area of the section of the channel at the throat is comprised between 0.7 and 0.9 times the area of the section of the channel at the leading edges of the vane and of the arm.
 advantageously, but optionally, the guide assembly according to the invention further comprises at least one of the following features: the area of the section of the channel at the throat is comprised between 0.75 and 0.85 times the area of the section of the channel at the leading edges of the vane and of the arm.

the area of the section of the channel at the throat is comprised between 0.79 and 0.81 times the area of the section of the channel at the leading edges of the vane and of the arm.

the throat of the channel has an axial position $x_{throat}$ defined by:

$$x_{throat} = x_{1/2emax} \pm 0.05c$$

where $x_{1/2emax}$ is the axial position of the maximum thickness section of the arm on the lower surface 30$i$ side and c is the length of the axial chord of the guide vane, and the axial position of the maximum thickness section of the arm on the lower surface 30$i$ side is comprised between the axial position of the leading edge and that of the trailing edge of the vane.

The invention also has as its object a bypass type turbine engine, comprising a secondary flow guide comprising a plurality of vanes arranged radially around an axis of the turbine engine, and at least one structural arm, characterized in that at least one structural arm and a vane of the guide form a guide assembly according to the foregoing description.

The proposed air flow guide assembly has improved aerodynamic performance.

The proposed ratio between the section of the air stream between the structural arm and the guide vane at the throat and that at the leading edges of the arm and the vane impose an optimum camber line for the vane.

In fact, for a greater ratio, the guide vane has too much camber. The result is a stream with a considerable section at the throat and after it, which provokes, as described previously, an acceleration of the air flow when passing through the throat, with potentially a shock wave and a separation of the boundary layer of the air flow downstream of the throat.

For a lower ratio, the guide vane is less cambered. The result is a smaller section of the stream at the throat, with a lower air flow rate. Although this prevents the formation of a shock wave, the reduction of the air flow rate in this stream induces a redistribution of the full flow rate of air of the secondary flow in the guide, which causes distortions in static pressure extending upstream of the guide which can adversely affect aerodynamic and aero-acoustic performance of the fan.

Thus, the determined ratio is optimized for avoiding the shock wave and boundary layer separation phenomenon, and to minimize the reduction in flow rate in the stream between the arm and the guide vane.

DESCRIPTION OF THE DRAWINGS

Other features, aims and advantages of the invention will be revealed by the description that follows, which is purely illustrative and not limiting, and which must be read with reference to the appended drawings wherein:

FIG. 1$b$, already described, shows a developed schematic view of an assembly comprising a structural arm between two secondary flow guide vanes, FIG. 1$c$, already described, shows the aerodynamic effects of a guide vane on the lower surface 30$i$ side of the excessively cambered structural arm, FIG. 2$a$ shows an air flow guide assembly conforming to an embodiment of the invention.

DETAILED DESCRIPTION OF AT LEAST ONE EMBODIMENT OF THE INVENTION

Figure 1A:
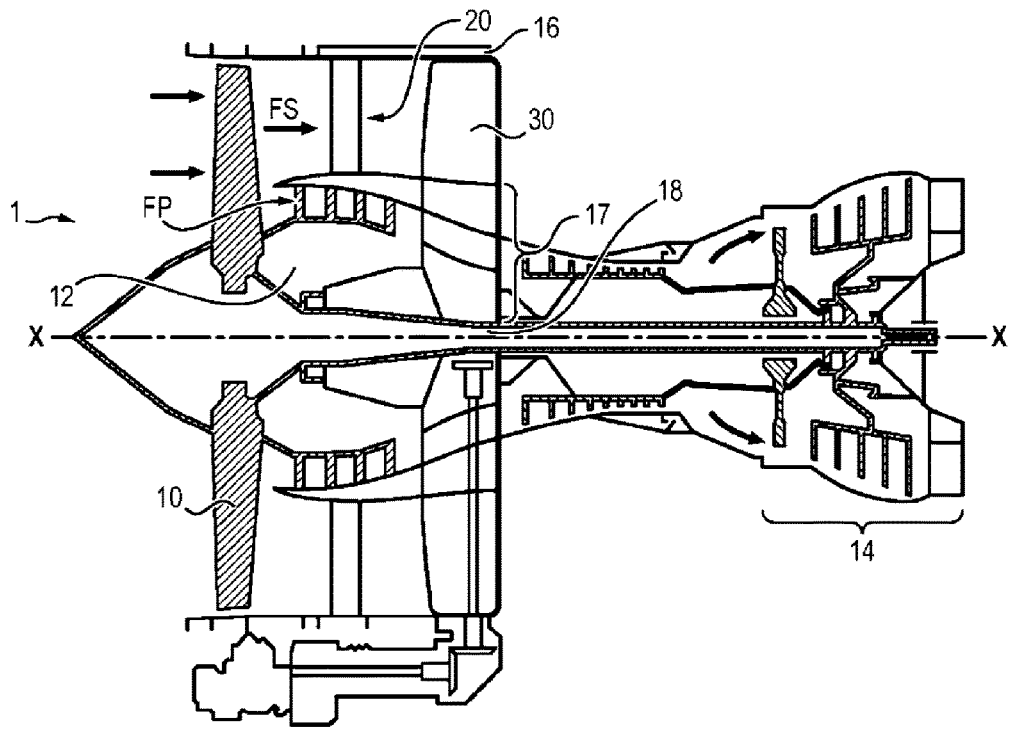
FIG. 1$a$, already described, shows schematically a bypass type turbine engine.
Figure 1B:
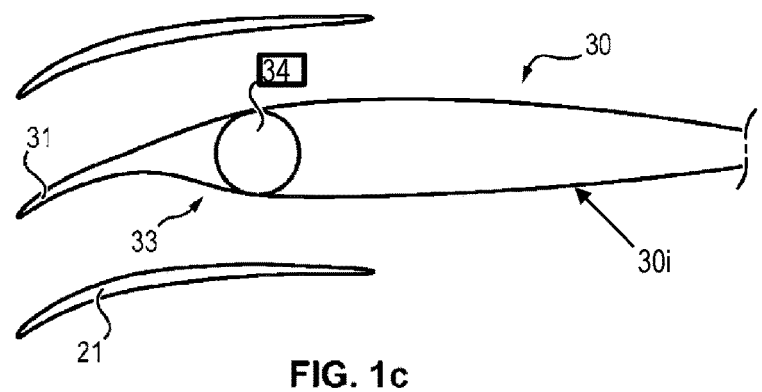
Figure 1C:
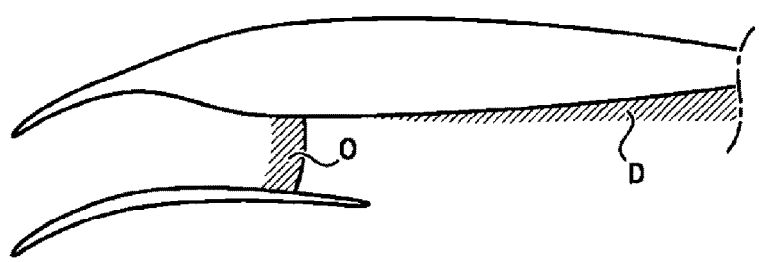
Figure 2A:
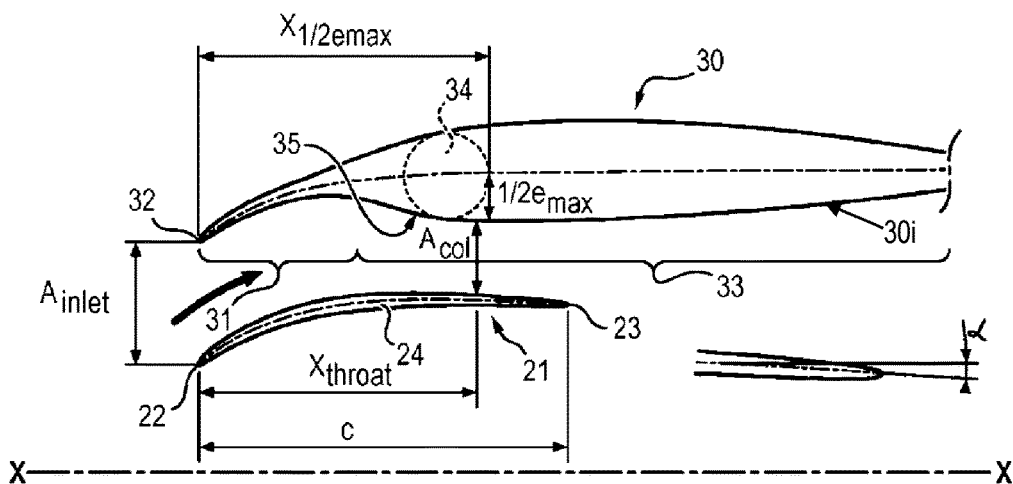
FIG. 2$b$ illustrates schematically a turbine engine conforming to an embodiment of the invention.
Figure 2B:
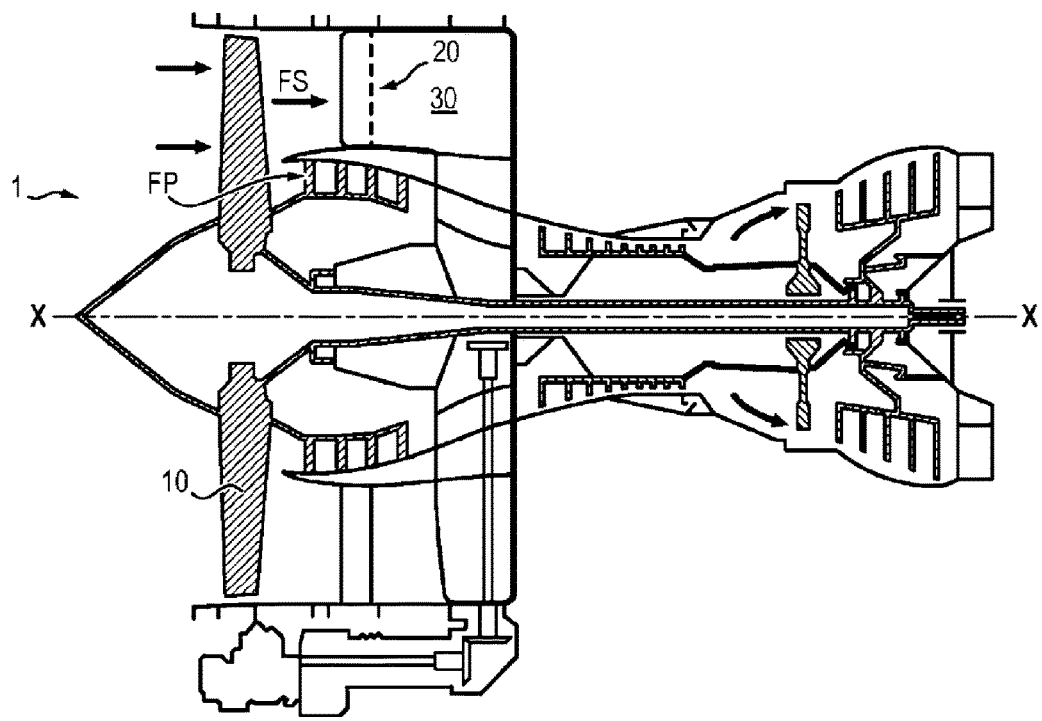

With reference to FIG. 2$b$, a bypass type turbine engine 1 is shown comprising, as described previously a fan 10 and a guide 20 of the OGV type, to guide a secondary flow FR derived from the fan 10.

The guide comprises a plurality of vanes 21 distributed regularly around a ring (not shown) centered on an axis X-X of the turbine engine, corresponding to the axis of the engine shaft.

In addition, the turbine engine 1 comprises at least one structural arm 30 described in more detail below.

Each assembly comprising a structural arm 30 and the vane 21 of the guide 20 adjacent to said arm on its lower surface 30$i$ side is called an air flow guide assembly, and is represented in more detail in FIG. 2$a$.

The vane 21 and the structural arm 30 extend radially around the axis X-X of the turbine engine, FIG. 2$a$ being a developed view of the angular sector surrounding the axis X-X covered by the vane 21 and the arm 30. The vane 21 and the structural arm 30 define between them an air flow channel of the secondary flow.

The vane 21 conventionally comprises a leading edge 22, a trailing edge 23, and a camber line 24 extending from the leading edge to the trailing edge, the camber line being the line halfway between the lower surface 30$i$ and the upper surface of the vane.

In addition the camber angle, denoted a, is defined at each point of the camber line by the angle formed between the tangent to the camber line at this point and the axis X-X of the turbine engine.

The vane 21 is preferably formed so as to have a nonzero angle α at its leading edge.

The structural arm 30 is of the "integrated guide vane" type, i.e. it comprises an upstream end portion 31 having the profile of a guide vane.

In particular, the upstream end portion 31 has a leading edge 32 aligned with that of the vanes 21 of the guide 20, i.e. at the same level with respect to the axis X-X, and has, at least at its leading edge, the same thickness and the same camber angle as a vane 21 of the guide 20.

The structural arm 30 further includes a downstream portion 33, firmly attached to the upstream end portion 31 and directly adjacent thereto.

The structural arm 30 is advantageously of the auxiliary type, meaning that its main function is that of transmitting power from the turbine engine to the rest of the airplane.

In this regard, to support the loads required for this power transmission, the walls of the downstream portion 33 adjacent to the portion 31 are advantageously manufactured by casting. Moreover, the downstream portion 33 includes a hollow zone 34 called a keep-out zone dedicated to the implantation of utilities, and in particular one or more transmission shafts, and lines, connections, etc. if required.

Thus, the upstream portion 31 of the structural arm forms one of the vanes 21 of the guide 20 of the turbine engine. If the turbine engine comprises several identical structural arms 30 distributed around the axis X-X, it advantageously comprises as many guide assemblies like that of FIG. 2$a$, each comprising a structural arm and the vane of the guide adjacent thereto, on its lower surface 30$i$ side.

Returning to FIG. 2$a$, the junction between the profiled upstream end portion 31 and the hollow zone 34 forms, on the lower surface 30i side of the structural arm 30, a shoulder 35, which reduces the section of the channel extending between the arm 30 and the vane 21. The section considered is a developed section of the angular sector around the axis X-X covered by the vane 21 and the arm 30, i.e. a two-dimensional zone defined by the intersection between the channel extending between the vane 21 and the arm 30 and a cylinder with an axis X-X of equal radius comprised between the radius of the vane root and the radius of the vane tip, preferably comprised between 5 and 95% of the radial height of the vane and of the arm, the intersection then being developed.

The axial position of the section of the arm 30, transverse to the axis X-X, having a maximum thickness on the lower surface 30i side of the arm, is denoted $x_{1/2emax}$, this thickness being measured between the camber line and the surface on the lower surface 30i side. This section of the arm with a maximum thickness resulting from the shoulder 35 and from the hollow zone 34, it is located at an axial position comprised between the axial positions of the leading edge 22 and of the trailing edge 23 of the vane 21.

Noted mathematically, if the origin of the axis with respect to which the axial position $x_{1/2emax}$ is measured is brought back to the leading edge of the vane:

$$0.0 < x_{1/2emax} \leq 1.0c$$

Where c is the axial chord of the vane, i.e. the distance, measured in the direction of the axis X-X between the leading edge and the trailing edge of the vane.

This geometry of the arm 30 defines, in the channel extending between the arm 30 and the vane 21, a throat, i.e. a minimum-section zone of the channel, upstream of which the channel is convergent—with a decreasing section from upstream to downstream with respect to the air flow direction—and downstream of which the channel is divergent—with an increasing section from upstream to downstream.

The axial position of the throat of the channel is denoted $x_{throat}$, the area of the section of the channel at the throat $A_{throat}$ and the area of the inlet section, located at the leading edges 22 and 32, $A_{inlet}$.

The area of a section of the channel is calculated as the integral, over the height of the channel measured in the radial direction around the axis X-X, of the distance extending between the lower surface 30i of the arm and the upper surface of the vane at the section considered.

The inventors have determined that the aerodynamic performance of the air flow guide assembly depend on the degree of shrinkage of the channel between the inlet section and the throat section.

More precisely, to avoid a shock wave and boundary layer separation phenomenon, the ration between the area $A_{throat}$ of the section of the channel at the throat and the area $A_{inlet}$ of the section of the channel at the inlet must be less than 0.9.

Moreover, to avoid static pressure distortions in the guide 20 connected with too low a flow rate in the channel situated between the arm 30 and the vane 21, the same ratio must be greater than 0.7.

Thus it is noted:

$$0.7 \leq \frac{A_{throat}}{A_{inlet}} \leq 0.9$$

Preferably, we have $$0.75 \leq \frac{A_{throat}}{A_{inlet}} \leq 0.085$$

More advantageously, we have:

$$0.79 \leq \frac{A_{throat}}{A_{inlet}} \leq 0.81$$

In fact, the inventors have observed that an optimum value of this ratio can be 0.8 for some engines.

Moreover, the position of the throat must be close to the axial position of the maximum thickness section on the lower surface 30i side of the arm 30, and more specifically:

$$x_{throat} = x_{1/2emax} \pm 0.05c$$

The position of the throat and the area of the section of the channel at the throat allow, with a fixed geometry of the guide arm 30, to determine the camber line of the vane 21 and therefore to also determine the geometry of the vane.

Thus a configuration of a guide assembly is proposed, allowing optimization of the aerodynamic performance of this assembly.

The invention claimed is:

1. A turbine engine air flow guide assembly comprising:
   a structural arm and
   at least one guide vane, situated at a lower surface of the structural arm and comprising a leading edge, a trailing edge and a camber line extending between the leading edge and the trailing edge,
wherein the vane and the arm extend radially between an annular inner wall and an annular outer wall around an axis (X-X) of the turbine engine and define an air flow channel between them, and the structural arm comprises:
   an upstream end, with respect to the air flow direction in the channel, having a guide vane profile and comprising a leading edge aligned with the leading edge of the vane, and
   a shoulder situated at the lower surface of the arm, defining a throat in the channel upstream of which the channel is convergent and downstream of which it is divergent,
wherein the area ($A_{throat}$) of the section of the channel at the throat is comprised between 0.7 and 0.9 times the area ($A_{inlet}$) of the section of the channel at the leading edges of the vane and of the arm.

2. The turbine engine air flow guide assembly according to claim 1, wherein the area ($A_{throat}$) of the section of the channel at the throat is comprised between 0.75 and 0.85 times the area ($A_{inlet}$) of the section of the channel at the leading edges of the vane and of the arm.

3. The turbine engine air flow guide assembly according to claim 2, wherein the area ($A_{throat}$) of the section of the channel at the throat is comprised between 0.79 and 0.81 times the area ($A_{inlet}$) of the section of the channel at the leading edges of the vane and of the arm.

4. The turbine engine air flow guide assembly according to claim 1, wherein the throat of the channel has an axial position $x_{throat}$ defined by:

$$x_{throat} = x_{1/2emax} \pm 0.05c$$

where $x_{1/2emax}$ is the axial position of the maximum thickness section of the arm on the lower surface side and c is the length of the axial chord of the guide vane, and the axial position of the maximum thickness section of the arm on the lower surface side is comprised between the axial position of the leading edge and that of the trailing edge of the vane.

5. A bypass type turbine engine, comprising a secondary flow guide comprising a plurality of vanes arranged radially around an axis (X-X) of the turbine engine, and at least one structural arm, wherein at least one structural arm and a vane of the guide form a guide assembly according to claim 1.

* * * * *